(12) United States Patent
Unemura (10) Patent No.: US 6,587,153 B1
(45) Date of Patent: Jul. 1, 2003

(54) DISPLAY APPARATUS

(75) Inventor: Toyoaki Unemura, Itami (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 362 days.

(21) Appl. No.: 09/679,817

(22) Filed: Oct. 5, 2000

(30) Foreign Application Priority Data

Oct. 8, 1999 (JP) .......................................... 11-288096

(51) Int. Cl.$^7$ ................................................ H04N 7/00
(52) U.S. Cl. ..................................................... 348/468
(58) Field of Search ................................ 348/468, 465, 348/705, 706, 563, 564, 553, 554; H04N 7/00

(56) References Cited

U.S. PATENT DOCUMENTS

| | | | | |
|---|---|---|---|---|
| 5,327,176 A | * | 7/1994 | Forler et al. ................. | 348/564 |
| 5,900,913 A | * | 5/1999 | Tults ............................ | 348/468 |
| 6,011,594 A | * | 1/2000 | Takashima ................... | 348/565 |

* cited by examiner

Primary Examiner—Michael Lee
(74) Attorney, Agent, or Firm—Wenderoth, Lind & Ponack, L.L.P.

(57) ABSTRACT

In a display apparatus (PI) displaying a closed-caption (Scc, DS) multiplexed in the first and second component video signals (Scv1: Y, PB, and PR, Svc2: Y and C) received from externally provided video signal sources, a video signal selector (7) selects one of said first and second component video signals (Scv1, Scv2); a closed-caption extractor (3) extracts the closed-caption (Scc, DS) from said selected one of first and second component video signals (Scv1, Scv2); and a controller (10) controls the closed-caption extractor (3) based on the format type of the selected first and second component video signals (Scv1 and Scv2).

5 Claims, 6 Drawing Sheets

DISPLAY APPARATUS

BACKGROUND OF THE INVENTION

1. Field of the Invention

The present invention relates to a display apparatus that will not fail to display a closed-caption superimposed on a component video signal provided thereto.

2. Description of the Background Art

Figure 5:
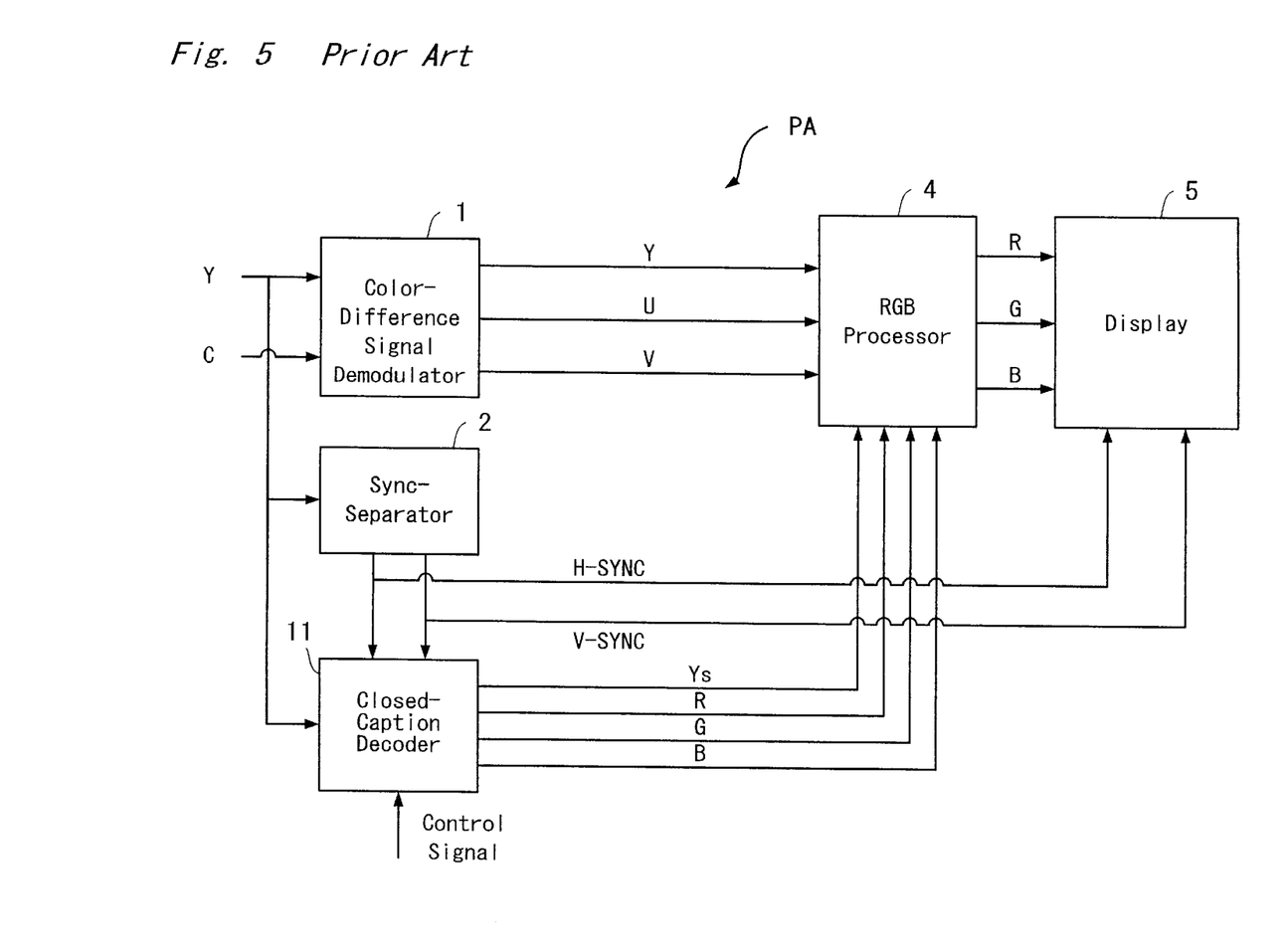
FIG. 5 is a block diagram showing the structure of a conventional display apparatus.

In FIG. 5, the structure of a conventional display apparatus, typically a television receiver, is schematically shown. A conventional display apparatus PA includes a color-difference signal demodulator 1, a sync-separator 2, a closed-caption (hereinafter abbreviated as CC) decoder 3, an RGB processor 4; and a display 5.

The color-difference signal demodulator 1 demodulates a luminance signal Y and a chroma signal C of NTSC into a color-difference signal U (B-Y) and a color difference signal V (R-Y). The sync-separator 2 separates and extracts a horizontal synchronization signal H-SYNC and a vertical synchronization signal V-SYNC from the luminance signal Y.

The CC (Closed-Caption) decoder 3 extracts data from a closed-caption signal, which is a VBI signal superimposed on the NTSC video signal at the 21H of the first field. Further, the CC decoder 3 decodes the extracted data into RGB display signals and a switching signal Ys for on-screen display process. The RGB processor 4 demodulates component video signals Y, U, and V into RGB signals. The display 5 is structured by a CRT and other components, and displays an image based on the RGB signals.

The operation of the above display apparatus PA is now briefly described. A conventional NTSC composite video signal is separated into the luminance signal Y and the chroma signal C. These separated signals Y and C are then demodulated by the color-difference signal demodulator 1 into a component video signal Scv (not shown) composed of the luminance signal Y, the color-difference signal U, and the color-difference signal V. Note that the luminance signal Y and the chroma signal C may be provided via a so-called S terminal.

The luminance signal Y is provided to the color-difference signal demodulator 1 and also to the sync-separator 2. The sync-separator 2 separates the horizontal synchronization signal H-SYNC and the vertical synchronization signal V-SYNC from the luminance signal Y, and then outputs the separated signals to deflection circuits in the CC decoder 3 and the display 5.

The CC decoder 3 extracts the caption data from the closed-caption signal superimposed on the luminance signal Y. The CC decoder 3 also generates the RGB signals R, G, and B and the switching signal Ys that are synchronized with the synchronization signals H-SYNC and V-SYNC provided by the sync-separator 2, and outputs the generated signals to the RGB processor 4.

The RGB processor 4 switches, or exclusively selects the source of the RGB signals to be received based on the switching signal Ys. That is, if the switching signal Ys is invalid, the RGB processor 4 converts the luminance signal Y and the color-difference signals U and V provided by the color-difference signal demodulator 1 into RGB signals (R, G, B) for output. On the other hand, if the switching signal Ys is valid, the RGB processor directly outputs the RGB signals (R, G, B) provided by the CC decoder 3 to the display 5.

Figure 6:
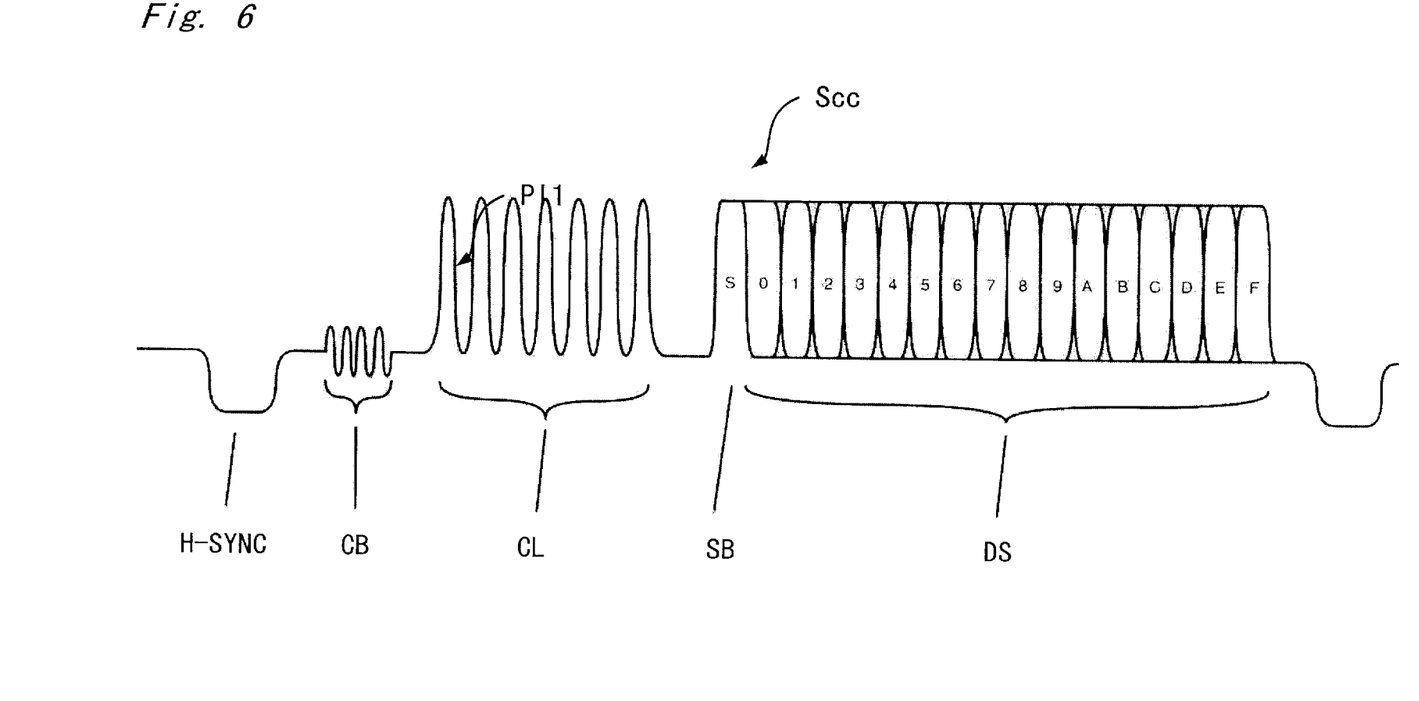
FIG. 6 is a diagram showing a waveform of a closed-caption signal.

In FIG. 6, an example of the waveform of the closed-caption signal superimposed on the NTSC video signal (luminance signal Y) is shown. As stated above, a closed-caption signal Scc is multiplexed (superimposed) on the 21H of the first field of the NTSC video signal. The closed-caption signal Scc is synchronized with a clock during a clock line CL.

The closed-caption signal Scc is composed of a start bit SB (represented by S in FIG. 6) and a 16-bit (2-byte) data stream DS that include 2-byte-type control data, one-byte-type character data, and 2-byte-type special character data. A color burst signal is inserted between the clock line CL and the horizontal synchronization signal H-SYNC. A detailed description of the closed-caption code system is provided in FCC 91-119 and FCC92-157 by Federal Communications Commission (FCC). Therefore, further description is omitted herein.

In the conventional display apparatus as described above, closed-caption data can be extracted if the closed-caption data signal Scc is superimposed on the NTSC video signal, but cannot be extracted if superimposed on the component video signal. In other words, the conventional display apparatus does not support such a case where a closed-caption is superimposed on the luminance signal Y from upcoming video equipment having a terminal for a component video output composed of the luminance signal Y, a color-difference signal PB (Cb), and a color-difference signal PR (Cr).

Various video signal modes such as 480i, 480p, and 1081i are expected for digital broadcasting. For the present, video signals of such modes are received and demodulated by an STB (Set-Top Box), outputted as components Y, PB, and PR, and coupled to a display apparatus such as a television receiver. Of these video signal modes, a signal of the 480i-interlace mode is more likely to have a closed-caption superimposed thereon. In such case, when signals of the other modes are decoded, a closed-caption will be erroneously detected.

In other words, it is assumed in the display apparatus PA, as in a non-progressive DVD player, that only the 480i-interlace video signal are to outputted. However, when progressive DVD players emerge, not the 480i-interlace video signal but a 480p-progressive video signal of 480 valid scanning lines may be provided. Furthermore, when digital television broadcasting starts, a 1080i-interlace video signal or 720p-progressive video signal may be provided from a digital television STB other than the 480p-progressive video signal.

However, it is assumed that the closed-caption signal Scc is superimposed on the 21H of the 480i video signal. Therefore, if a signal of another mode such as the above-mentioned progressive signal is directly provided to the display apparatus PA as the component video signal Scv, the CC decoder 3 may erroneously detect the provided component video signal Scv and offer an erroneous character display.

SUMMARY OF THE INVENTION

Therefore, an object of the present invention is to provide a display apparatus that offer a correct display a closed-caption display even if a video signal of other than the 480i mode.

The present invention has the following features to solve the problem.

A first aspect of the present invention is directed to a display apparatus for displaying a closed-caption multiplexed in different format types of video signals received from externally provided video signal sources, the apparatus comprising:

a first component video signal receiver for receiving a first component video signal from one of the video signal sources;

a second component video signal receiver for receiving a composite video signal from another of the video signal sources to produce a second component video signal;

a selector for selecting one of the first and second component video signals;

a closed-caption extractor for extracting the closed-caption from the selected one of first and second component video signals; and a controller for controlling the closed-caption extractor based on the format type of the selected one of first and second component video signals.

According to a second aspect, in the first aspect, the controller enables the closed-caption extractor when the second component video signal is selected.

According to a third aspect, in the first aspect, the display apparatus further comprises a video format determiner for determining a video format type of the first component video signal based on a luminance signal thereof when the first component video signal is selected, and the controller controls the closed-caption extractor based on the determined video format type.

According to a fourth aspect, in the third aspect, the controller enables the closed-caption extractor only when the determined video format type is NTSC.

According to a fifth aspect, in the third aspect, the video format determiner comprises:

a synchronizing extractor for extracting a horizontal synchronization signal and a vertical synchronization signal from the luminance signal;

a video signal format storage for storing discrimination data discriminating each of plural video formats; and a determiner for comparing the extracted horizontal and vertical signals with the discrimination data to determine the video format type of the first component video signal.

These and other objects, features, aspects and advantages of the present invention will become more apparent from the following detailed description of the present invention when taken in conjunction with the accompanying drawings.

DESCRIPTION OF THE PREFERRED EMBODIMENTS (First Embodiment)

Figure 1:
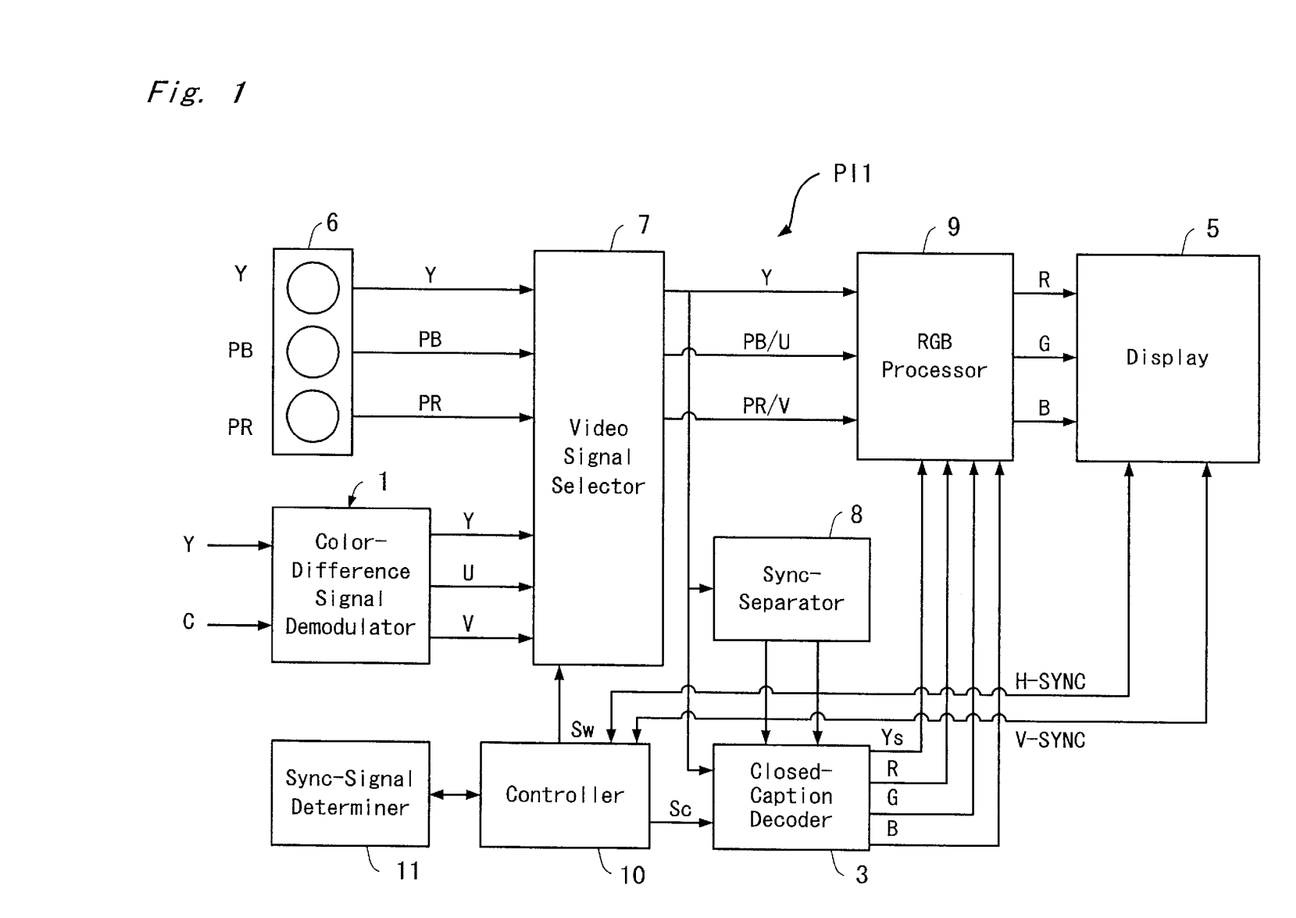
FIG. 1 is a block diagram showing the structure of a display apparatus according to a first embodiment of the present invention.

Referring to FIG. 1, the structure of a display apparatus according to a first embodiment of the present invention is described. A display apparatus PI1 includes a color-difference signal demodulator 1, a CC decoder 3, a display 5, a component video signal input terminal 6, a video signal selector 7, a sync-separator 8, an RGB processor 9, a controller 10, and a synchronizing signal determiner 11.

The component video signal input terminal 6 receives a first component video signal Scv1 from an external component video signal source typified by a digital-television STB or DVD player. The component video signal Scv1 includes a luminance signal Y, a color-difference signal PB, and a color-difference signal PR. The first component video signal input terminal 6 provides these signals Y, PB, and PR forming the component video signal Scv1 to the video signal.selector 7.

The color-difference demodulator 1 generates a second component video signal Scv2 from a luminance signal Y and a chroma signal C obtained based on a composite video signal of any of various television-standard systems, typically the NTSC system.

The second component video signal Scv2 includes a luminance signal Y, a color-difference signal U (B-Y), and a color-difference signal V (R-Y). These signals Y, U, and V forming the second component video signal Scv2 are provided to the video signal selector 7. Note that the luminance signal Y and the chroma signal C provided to the color-difference demodulator 1 come from a Y/C separator (not shown) after being Y/C-separated from the NTSC composite video signal thereby, or from a so-called S terminal of a video tape recorder.

The video signal selector 7 selectively outputs, based on a selection signal Sw provided by the controller 10, one of the first component video signal Scv1 (Y, PB, PR) provided by the component video signal input terminal 6 and the second component video signal Scv2 (Y, U, V) provided by the color-difference signal demodulator 1. The selection signal Sw is a two-level signal indicative of either a high-level or a low-level. The video signal selector 7 is structured to select the component video signal input terminal 6 when the selection signal is at the high-level, while to select the color-difference signal demodulator 1 when the selection signal Sw is at the low-level.

The sync-separator 8, structured by a sync-separating circuit, separates and extracts a horizontal synchronization signal H-SYNC and a vertical synchronization signal V-SYNC from the luminance signal Y included in either the first or second component video signal Scv1 or Scv2 for output to the CC decoder 3, the display 5, and the controller 10.

The synchronizing signal determiner 11 previously stores expected horizontal and vertical synchronization frequencies of the luminance signal Y and the color-difference signals PB and PR of various types. Other than the synchronizing frequencies are stored as the discrimination data necessary to determine the video format type of the component video signal may be stored in the synchronizing signal determiner 11. The synchronizing signal determiner 11 compares frequencies of the horizontal and vertical synchronization signals H-SYNC and V-SYNC provided to and measured by the controller 10 with those previously stored in order to specify the format type of the video signal provided.

The controller 10 generates the selection signal Sw depending on the type of an input signal coming from a remote controller (not shown) operated by a user to control the video signal selector 7. The controller 10 also generates a control signal Sc based on the type of the video signal specified by the synchronizing signal determiner 11 to control the CC decoder 3.

The CC decoder 3 extracts closed-caption data from the closed-caption signal Scc superimposed on the second component video signal Scv2, which is the NTSC video signal, based on the control signal Sc provided by the controller 10. The CC decoder 3 carries out an on-screen display process, decodes the extracted closed caption data into RGB signals (R, G, B) and the switching signal Ys, and outputs the decoded signals to the RGB processor 9.

The RGB processor 9 generates RGB signals that correspond to the first component video signal Scv1 (Y, PB, PR) or the second component video signal Scv2 (Y, U, V) provided by the video signal selector 7 for output to the display 5.

The operation of the display apparatus PI1 is now described below. First, the user operates the remote controller to select the video signal to be inputted to the display apparatus PI1. The controller 10 generates the selection signal Sw based on the selection to control the switching between the first and second component video signals provided by the video signal selector 7. If the user also selects a closed-caption function by using the remote controller, the controller 10 generates the control signal Sc to enable the CC decoder 3.

If the user selects the NTSC side, that is, the second component video signal Scv2, the controller 10 generates the selection signal Sw for controlling the video signal selector 7 to select the color-difference demodulator 1 so that the luminance signal Y and the color-difference signals U and V are taken as input signals. As a result, the luminance signal Y of the second component video signal Scv2 outputted from the video signal selector 7 is separated by the sync-separator 8 into the horizontal and vertical synchronization signals H-SYNC and V-SYNC. These synchronizing signals H-SYNC and V-SYNC are provided to a deflection circuit in the display 5 and also to the CC decoder 3, and act as synchronizing signals for the RGB signals and the Ys signal outputted from the CC decoder 3.

In the CC decoder 3, the closed-caption data is obtained from the closed-caption signal Scc, which is a VBI signal superimposed on the provided luminance signal Y. The obtained closed-caption data is decompressed by the CC decoder 3 for on-screen display depending on the setting of the controller 10. The RGB signals (R, G, B) and the switching signal Ys resulted from the decompression are outputted to the RGB processor 9.

The RGB processor 9 converts the first component video signal Scv1 (Y, PB, PR) or the second component video signal Scv2 (Y, U, V) selectively outputted from the video signal selector 7 into RGB signals (R, G, B) in a color matrix corresponding to the selected component video signal.

However, if the switching signal Ys from the CC decoder 3 is valid, the RGB signals (R, G, B) from the CC decoder 3 are provided to the RGB processor 9. If the switching signal Ys is invalid, the RGB signals (R, G, B) converted from the first component video signal Scv1 (Y, PB, PR) or the second component video signal Scv2 (Y, U, V) provided by the video signal selector 7 are provided to the RGB processor 9. The RGB processor 9 carries out an image display based on the provided RGB signals (R, G, B).

On the other hand, if the user selects the component video signal input terminal 6 side, that is, the first component video signal Scv1, the controller 10 generates the selection signal Sw for controlling the video signal selector 7 to select the component video signal input terminal 6 so that the luminance signal Y and the color-difference signals PB and PR are taken as the input signal. As a result, the luminance signal Y of the first component video signal Scv1 outputted from the video signal selector 7 is separated by the sync-separator 8 into the horizontal and vertical synchronization signals H-SYNC and V-SYNC.

These synchronizing signals H-SYNC and V-SYNC are provided to the deflection circuit in the display 5 and also to the CC decoder 3, and act as synchronizing signals for the RGB signals and the switching signal Ys outputted from the CC decoder 3. Thereafter, the operation is similar to that in the above-mentioned case where the user selects the second component video signal Scv2, and therefore description is not made herein.

Figure 2:
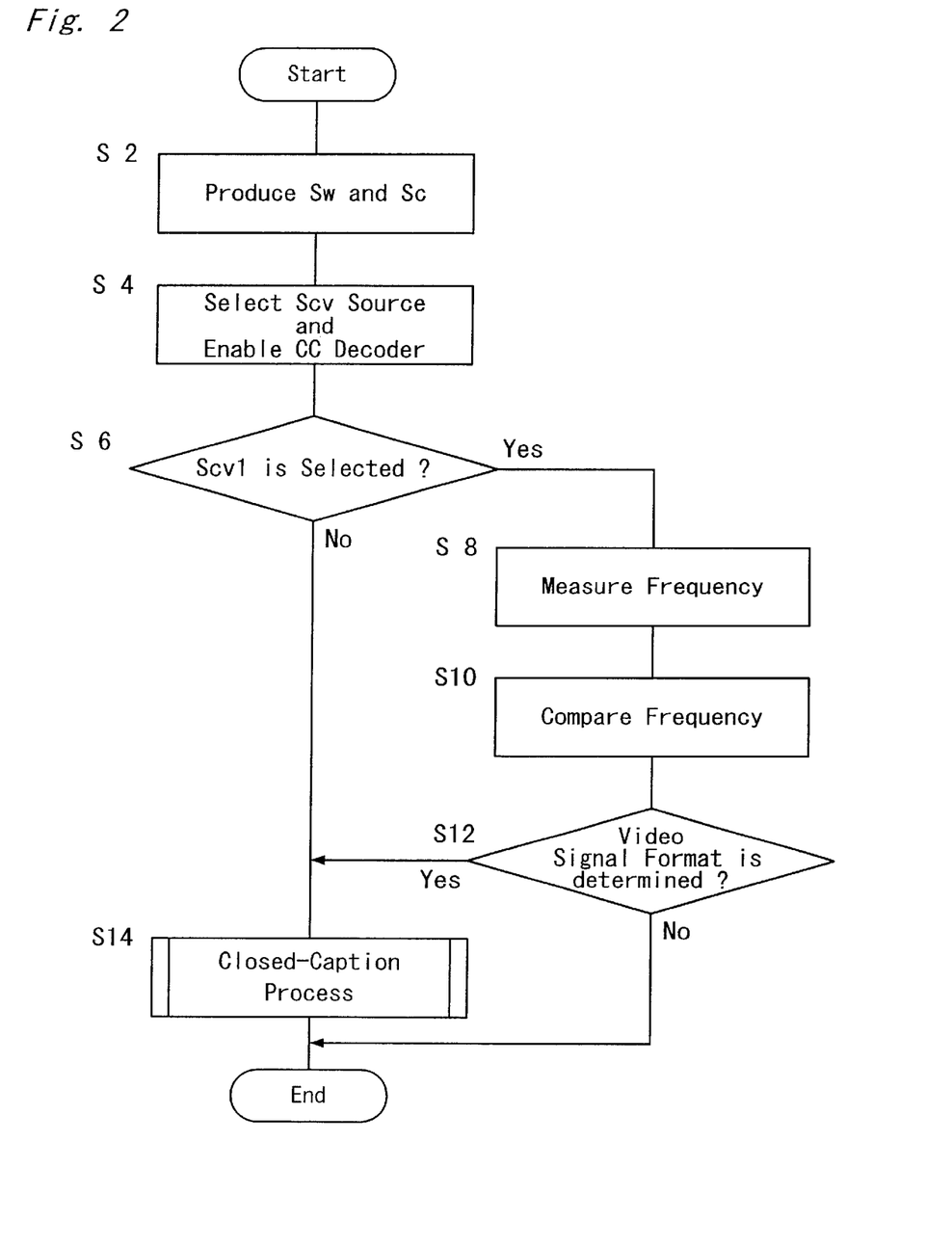
FIG. 2 is a flow chart showing the operation for closed-caption process in the display apparatus of FIG. 1.

Further referring to a flow chart shown in FIG. 2, the operation for closed-caption display in the display apparatus PI1 is described in detail. First, the user operates the remote controller to select the video signal to be inputted to the display apparatus PI1 and the closed-caption function.

Then, in step S2, the controller 10 generates the selection signal Sw and the control signal Sc based on the selection by the user. The procedure then goes to a next step S4.

In step S4, the video signal selector 7 outputs either one of the first or second component video signal Scv1 or Scv2 in response to the selection signal Sw. The CC decoder 3 is set enabled in response to the control signal Sc. The procedure then goes to a next step S6.

In step S6, if the first component video signal Scv1 (Y, PB, PR) is selected in step S2, the procedure goes to step S8.

In step S8, the controller 10 measures the frequency of the first component video signal Scv1 based on the horizontal and vertical synchronization signals H-SYNC and V-SYNC provided by the sync-separator 8. The procedure then goes to step S10.

In step S10, the controller 10 compares the frequency of the first component video signal Scv1 measured in step S8 with various frequencies stored in the synchronizing signal determiner 11 to specify the format type of the first component video signal Scv1. The procedure then goes to step S12.

In step S12, it is determined whether the first component video signal Scv1 is specified in type or not. If Yes, the procedure goes to step S14.

In step S14, the closed-caption data is extracted from the closed-caption signal Scc superimposed on the first component video signal Scv1, and a closed-caption process subroutine for display on the display 5 is executed. Then, the procedure ends.

On the other hand, if No in the above step S12, that is, if the first component video signal Scv1 cannot be specified in type, the closed-caption process cannot be correctly carried out. Therefore, the procedure ends right away.

Note that, if No in the above step S6, that is, if the NTSC second component video signal Scv2 satisfies the regulations of the closed-caption signal Scc, the process for specifying the video signal through steps S8, S10, and S12 is not required. Therefore, the procedure goes to step S14.

The controller 10 generates the selection signal Sw based on the type of the input signal through the remote controller (not shown) operated by the user to control the video signal selector 7. The controller 10 also generates the control signal Sc based on the format type of the video signal specified by the synchronizing signal determiner 11 to control the CC decoder 3.

If the user selects the NTSC side, that is, the second component video signal Scv2, the controller 10 generates the selection signal Sw for controlling the video signal selector 7 to select the color-difference demodulator 1 so that the luminance signal Y and the color-difference signals U and V are taken as input signals. As a result, the luminance signal Y of the second component video signal Scv2 outputted from the video signal selector 7 is separated by the sync-separator 8 into the horizontal and vertical synchronization signals H-SYNC and V-SYNC. These synchronizing signals H-SYNC and V-SYNC are provided to the deflection circuit in the display 5 and also to the CC decoder 3, and act as synchronizing signals for the RGB signals and the Ys signal outputted from the CC decoder 3.

In the CC decoder 3, the closed-caption data is obtained from the closed-caption signal Scc, which is a VBI signal superimposed on the provided luminance signal Y. The obtained closed-caption data is decompressed by the CC decoder 3 for on-screen display depending on the setting of the controller 10. The RGB signals (R, G, B) and the switching signal Ys resulted from the decompression are outputted to the RGB processor 9.

The RGB processor 9 converts the first component video signal Scv1 (Y, PB, PR) or the second component video signal Scv2 (Y, U, V) selectively outputted from the video signal selector 7 into RGB signals (R, G, B) in a color matrix corresponding to the selected component video signal.

However, if the switching signal Ys from the CC decoder 3 is valid, the RGB signals (R, G, B) from the CC decoder are provided to the RGB processor 9. If the switching signal Ys is invalid, the RGB signals (R, G, B) converted from the first component video signal Scv1 (Y, PB, PR) or the second component video signal Scv2 (Y, U, V) provided by the video signal selector 7 are provided to the RGB processor 9. The RGB processor 9 carries out an image display based on the provided RGB signals (R, G, B).

On the other hand, if the user selects the component video signal input terminal 6 side, that is, the first component video signal Scv1, the controller 10 generates the selection signal Sw for controlling the video signal selector 7 to select the component video signal input terminal 6 so that the luminance signal Y and the color-difference signals PB and PR are taken as the input signal. As a result, the luminance signal Y of the first component video signal Scv1 outputted from the video signal selector 7 is separated by the sync-separator 8 into the horizontal and vertical synchronization signals H-SYNC and V-SYNC.

These synchronizing signals H-SYNC and V-SYNC are provided to the deflection circuit in the display 5 and also to the CC decoder 3, and act as synchronizing signals for the RGB signals and the switching signal Ys outputted from the CC decoder 3. Thereafter, the operation is similar to that in the above-mentioned case where the user selects the second component video signal Scv2, and therefore description is not made herein.

In this way, in the display apparatus PI1, either when the closed-caption signal Scc is inputted as the luminance signal Y and the chroma signal C or when inputted as the luminance signal Y and the color-difference signals PB and PR, closed-caption data is obtained by the CC decoder 3 for on-screen display.

Based on the above disclosure for the display apparatus PI1, the basic concept of the display apparatus PI1 according to the present invention is now described. It is assumed that, when the user selects the component video signal input terminal 6, the video equipment used as a video signal source that provides the first component video signal Scv1 (Y, PB, PR) outputs only 480i interlace video signals, like a non-progressive-support DVD player.

However, if progressive-support DVD players emerge, a 480p-progressive video signal of 480 valid scanning lines may be provided. Furthermore, when digital television broadcasting starts, a 1081i-interlace video signal or 720p-progressive video signal may also be provided to the component video signal input terminal 6 for output from a digital television STB.

If such progressive signals are directly inputted as the first component video signal Scv1 to the display apparatus PI1, the luminance signal Y and the color-difference signals PB and PR can be correctly processed by the RGB processor 9. However, the closed-caption signal Scc is supposed to be superimposed on the 21H of the 480i video signal, and therefore if the other signal is inputted, the CC decoder 3 erroneously detects the inputted first component video signal Scv1, and may cause an erroneous character display.

To prevent the above problem, the controller 10 determines the frequency characteristics of the component video signal Scv1 based on the horizontal and vertical synchronization signals H-SYNC and V-SYNC extracted from the luminance signal Y of the component video signal Scv to be actually displayed on the display 5. The controller 10 also compares the determined frequency characteristics with data stored in the synchronizing signal determiner 11 to specify the format type of the component video signal Scv to be displayed on the display 5. If the component video signal Scv satisfies the regulations of the closed-caption signal Scc, the closed-caption process is carried out, and, if not, the closed-caption process is inhibited for preventing an erroneous closed-caption display.

(Second Embodiment)

Figure 3:
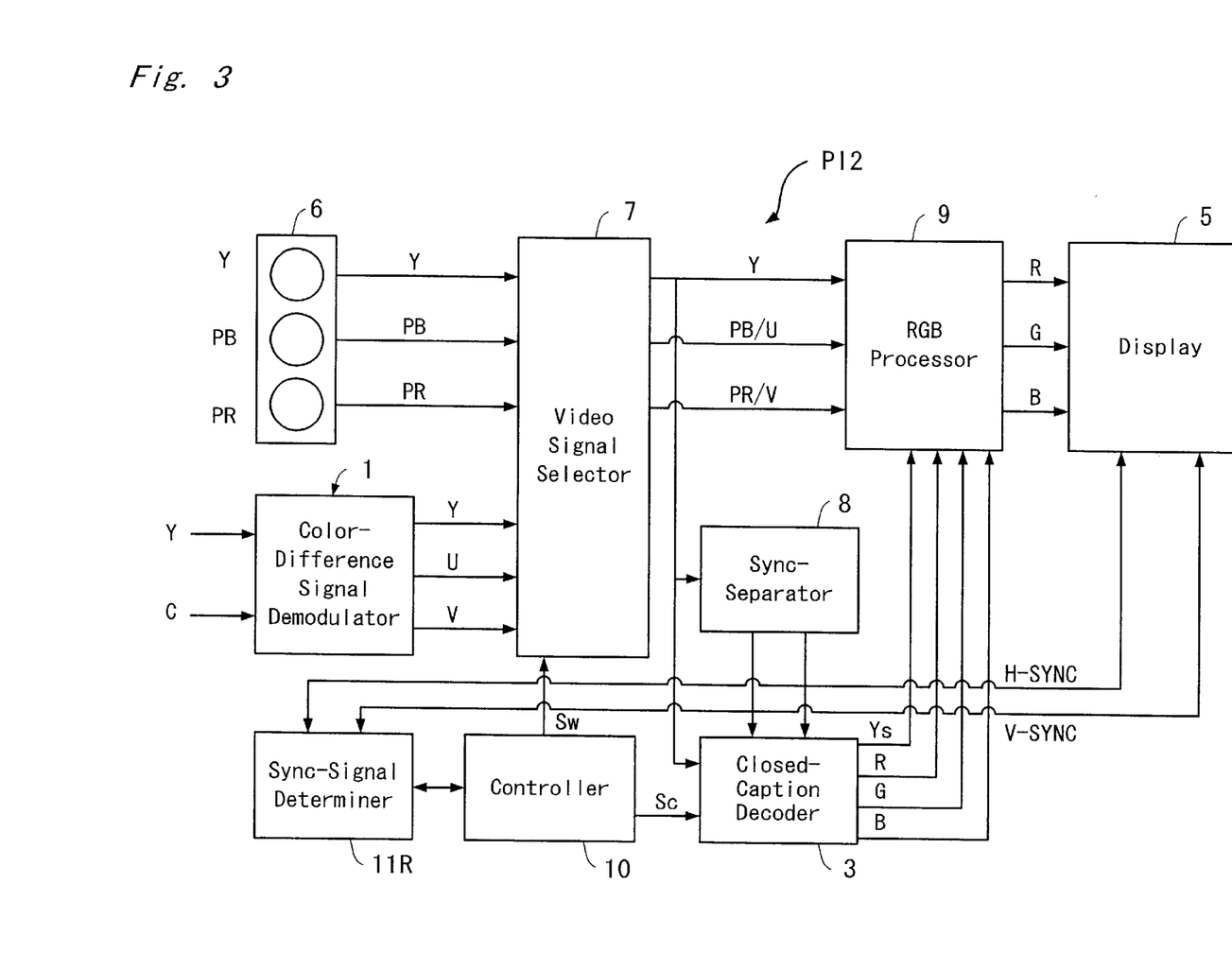
FIG. 3 is a block diagram showing the structure of a display apparatus according to a second embodiment of the present invention.

As shown in FIG. 3, a display apparatus PI2 according to a second embodiment of the present invention is similar in structure to the display apparatus PI1 shown in FIG. 1 except that a synchronizing signal determiner 11R is provided in place of the synchronizing signal determiner 11. Furthermore, the horizontal and vertical synchronization signals H-SYNC and V-SYNC are provided by the sync-separator 8 not to the controller 10 but to the synchronizing signal determiner 11R. Unlike the synchronizing signal determiner 11, the synchronizing signal determiner 11R specifies the format type of the video signal provided to the display apparatus PI2 also based on the horizontal and vertical synchronization signals H-SYNC and V-SYNC provided by the sync-separator 8.

As a result, when the user selects the component video signal input terminal 6 side (the first component video signal Scv1), the synchronizing signal determiner 11R measures the frequencies of the horizontal and vertical synchronization signals H-SYNC and V-SYNC provided by the sync-separator 8, and compares the measured frequencies with a table of video signal frequencies previously stored in the synchronizing signal determiner 11R. If determining that a video signal other than the 480i video signal is inputted, the controller 10 immediately disables the CC decoder 3 even though the user has previously set the CC decoder 3 enabled.

Note that the operation of the display apparatus PI2 is quite similar to that of the display apparatus PI1 shown in the flow chart of FIG. 2, and therefore only the difference therebetween is now described below. In the display apparatus PI2, instead of the controller 10, the synchronizing signal determiner 11R carries out measuring the frequency (step S8), comparing the frequencies (S10), and specifying the format type of the video signal (S12). Consequently, as compared with the display apparatus PI1, reduction in load on the controller 10 can be achieved. Furthermore, the synchronizing signal determiner 11R always monitors the component video signal Scv for specifying its format type. Therefore, the responsiveness to a closed-caption display instruction from the user can be improved.

If the user selects the NTSC side, the second component video signal Scv2 is a 480i signal composed of the luminance signal Y and the chroma signal C, whose horizontal synchronization signal H-SYNC is 15.734 kHz and whose vertical synchronization signal V-SYNC is 59.94 Hz.

Figure 4:
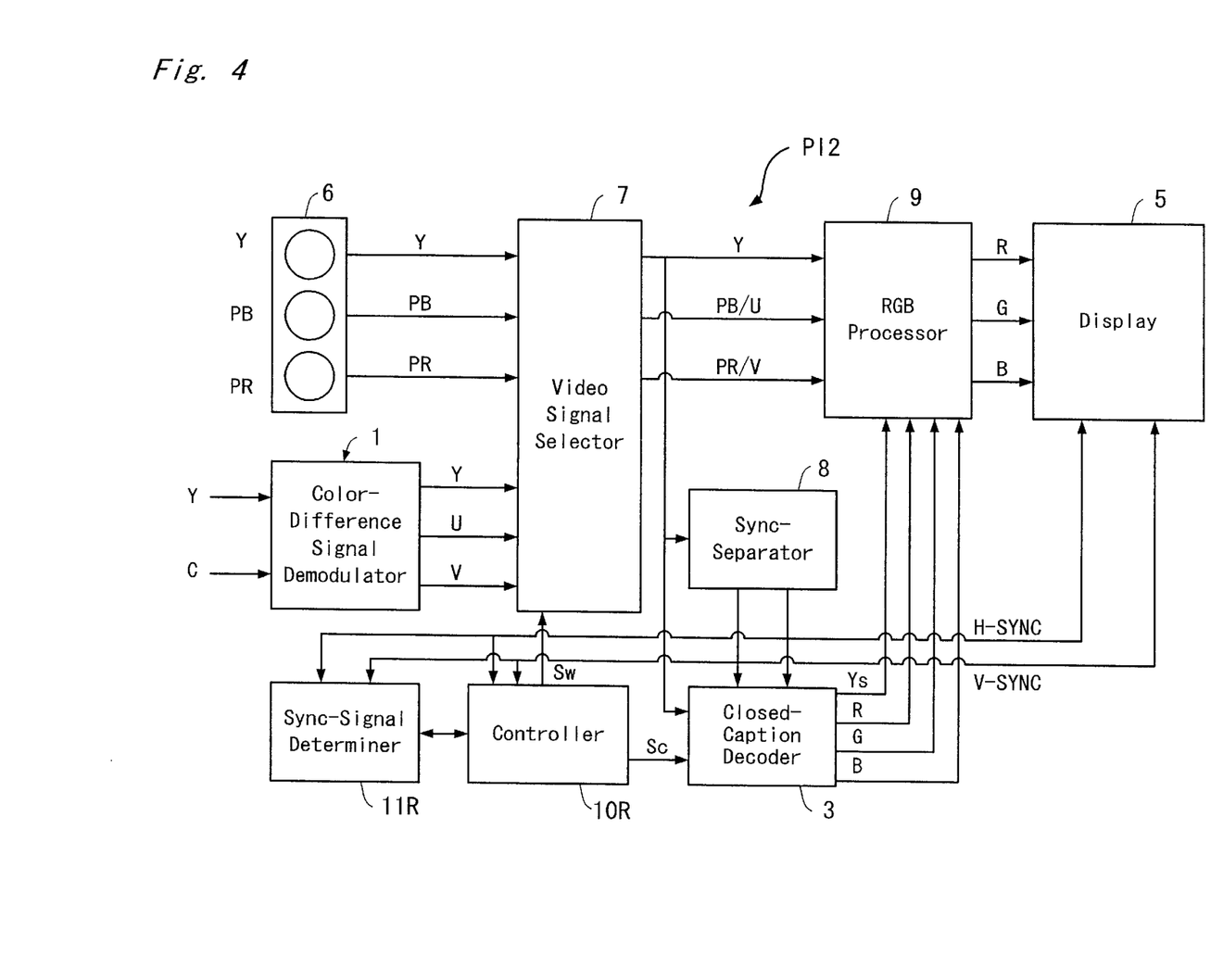
FIG. 4 is a block diagram showing an example modification of the display apparatus of FIG. 3.

Referring to FIG. 4, a modified embodiment of the display apparatus according to the second embodiment of the present invention is described. In a display apparatus PI2R according to the modified embodiment, a controller 10R replaces the controller 10 constructing the display apparatus PI2 shown in FIG. 3. Moreover, the horizontal and vertical synchronization signals H-SYNC and V-SYNC outputted from the sync-separator 8 are provided to the synchronizing signal determiner 11R and also to the controller 10R. As a result, the format type of the video signal (Scv1) can be recognized more correctly based on the frequency of the first component video signal Scv1 also provided to the controller 10R.

As stated above, according to the present invention, if a component video input terminal is provided to the display apparatus such as a television receiver, a closed-caption can be used as in a case where the conventional composite video signal or an input from an S terminal is provided. Furthermore, if various video signals such as 480p, 720p, and 1080i signals other than the 480i video signal are inputted, erroneous detection can be prevented, and an appropriate closed-caption signal process can be carried out, which is an extremely-advantageous effects of the present invention.

According to the present invention, the closed-caption signal is correctly obtained and reproduced on the display. Even if a signal other than the 480i video signal is inputted to the display apparatus, erroneous detection of the closed-caption signal is prevented. Therefore, the user can use the closed-caption function with easy and smooth operation, which is also an extremely-advantageous effect of the present invention.

While the invention has been described in detail, the foregoing description is in all aspects illustrative and not restrictive. It is understood that numerous other modifications and variations can be devised without departing from the scope of the invention.

What is claimed is:

1. A display apparatus for displaying a closed-caption multiplexed in different format types of video signals received from externally provided video signal sources, said apparatus comprising:

first component video signal receiving means for receiving a first component video signal from one of said video signal sources;

second component video signal receiving means for receiving a composite video signal from another of said video signal sources to produce a second component video signal;

selection means for selecting one of said first and second component video signals;

closed-caption extraction means for extracting said closed-caption from said selected one of first and second component video signals; and control means for controlling said closed-caption extraction means based on the format type of said selected one of first and second component video signals.

2. The display apparatus, as claimed in claim 1, wherein said control means enables said closed-caption extraction means when said second component video signal is selected.

3. The display apparatus, as claimed in claim 1, further comprising video format determination means for determining a video format type of said first component video signal based on a luminance signal thereof when said first component video signal is selected, wherein said control means controls said closed-caption extraction means based on said determined video format type.

4. The display apparatus, as claimed in claim 3, wherein said control means enables said closed-caption extraction means only when said determined video format type is NTSC.

5. The display apparatus, as claimed in claim 3, wherein said video format determination means comprises:

synchronizing extraction means for extracting a horizontal synchronization signal and a vertical synchronization signal from said luminance signal;

video signal format storing means for storing discrimination data discriminating each of said plurality of video formats; and determination means for comparing said extracted horizontal and vertical signals with said discrimination data to determine the video format type of said first component video signal.

* * * * *